United States Patent
Park et al.

(10) Patent No.: US 12,394,430 B2
(45) Date of Patent: Aug. 19, 2025

(54) METHOD AND APPARATUS WITH DECODING IN NEURAL NETWORK FOR SPEECH RECOGNITION

(71) Applicant: Samsung Electronics Co., Ltd., Suwon-si (KR)

(72) Inventors: Jinwoo Park, Seoul (KR); Min-Joong Lee, Suwon-si (KR); Jihyun Lee, Suwon-si (KR); Hoshik Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 144 days.

(21) Appl. No.: 17/511,900

(22) Filed: Oct. 27, 2021

(65) Prior Publication Data
US 2022/0301578 A1 Sep. 22, 2022

(30) Foreign Application Priority Data
Mar. 18, 2021 (KR) .......... 10-2021-0035353

(51) Int. Cl.
*G06N 3/04* (2023.01)
*G10L 15/16* (2006.01)
(Continued)

(52) U.S. Cl.
CPC ............. *G10L 21/04* (2013.01); *G06N 3/04* (2013.01); *G10L 15/22* (2013.01); *G10L 19/04* (2013.01); *G10L 25/30* (2013.01)

(58) Field of Classification Search
CPC ......... G10L 21/04; G10L 15/22; G10L 19/04; G10L 25/30; G10L 15/16; G10L 15/08;
(Continued)

(56) References Cited

U.S. PATENT DOCUMENTS 11,238,845 B2 * 2/2022 Chen ............... G10L 15/063
2005/0149326 A1 * 7/2005 Hogengout ......... G10L 15/08
704/E15.014
(Continued)

FOREIGN PATENT DOCUMENTS

KR 10-2007-0053598 A 5/2007
KR 10-2018-0123664 A 11/2018
(Continued)

OTHER PUBLICATIONS

Nguyen et al ("High Performance Sequence-to-Sequence Model for Straming Speech Recognition", Arxiv.org, Cornell University Library, Jul. 26, 2020) (Year: 2020).*
(Continued)

*Primary Examiner* — Michael N Opsasnick
(74) *Attorney, Agent, or Firm* — NSIP Law

(57) ABSTRACT

A decoding method includes receiving an input sequence corresponding to an input speech at a current time; and in a neural network (NN) for speech recognition, generating an encoded vector sequence by encoding the input sequence, determining reuse tokens from candidate beams of two or more previous times by comparing the candidate beams of the previous times, and decoding one or more tokens subsequent to the reuse tokens based on the reuse tokens and the encoded vector sequence.

22 Claims, 10 Drawing Sheets

(51) Int. Cl.
*G10L 15/22* (2006.01)
*G10L 19/04* (2013.01)
*G10L 21/04* (2013.01)
*G10L 25/30* (2013.01)

(58) Field of Classification Search
CPC ......... G10L 2015/085; G10L 2015/223; G10L 15/083; G10L 19/008; G06N 3/04; G06N 3/02
See application file for complete search history.

(56) References Cited

U.S. PATENT DOCUMENTS

| | | | |
|---|---|---|---|
| 2018/0013879 A1 | 1/2018 | Kim et al. | |
| 2018/0174576 A1* | 6/2018 | Soltau | G10L 15/02 |
| 2019/0114540 A1* | 4/2019 | Lee | G06N 3/08 |
| 2019/0371345 A1 | 12/2019 | Bhatia et al. | |
| 2019/0392319 A1 | 12/2019 | Shazeer et al. | |
| 2020/0082836 A1 | 3/2020 | Purnhagen et al. | |
| 2020/0160836 A1* | 5/2020 | Chen | G10L 15/16 |
| 2020/0175961 A1* | 6/2020 | Thomson | G10L 15/28 |
| 2020/0273447 A1* | 8/2020 | Zhou | G10L 15/148 |
| 2020/0335091 A1 | 10/2020 | Chang et al. | |
| 2020/0364303 A1* | 11/2020 | Liu | G10L 15/16 |
| 2021/0342686 A1* | 11/2021 | Kothari | G06N 3/08 |
| 2022/0100676 A1* | 3/2022 | Yan | G06N 3/08 |
| 2022/0101113 A1* | 3/2022 | Tam | G06N 3/045 |
| 2022/0164520 A1* | 5/2022 | Dolan | G06F 40/18 |
| 2023/0145535 A1* | 5/2023 | Hatamizadeh | G06N 3/02 514/460 |

FOREIGN PATENT DOCUMENTS

| | | |
|---|---|---|
| KR | 10-2018-0123686 A | 11/2018 |
| KR | 10-2020-0066367 A | 6/2020 |
| KR | 10-2020-0116968 A | 10/2020 |

OTHER PUBLICATIONS

Dong, Linhao, et al. "Speech-Transformer: A No Recurrence Sequence-To-Sequence Model for Speech Recognition." *International Conference on Acoustics, Speech and Signal Processing (ICASSP)*. IEEE, 2018 pp. 5884-5888.

Zhao, Yao, et al. "Paragraph-Level Neural Question Generation with Maxout Pointer and Gated Self-Attention Networks." *Proceedings of the Conference on Empirical Methods in Natural Language Processing* Oct. 31, 2018 pp. 3901-3910.

Xiong, Hao, et al. "DutongChuan: Context-Aware Translation Model for Simultaneous Interpreting." *arXiv:1907.12984v2* Aug. 16, 2019 pp. 1-19.

Chen, Nanxin, et al. "Non-Autoregressive Transformer Automatic Speech Recognition." *arXiv:1911.04908v1* Nov. 10, 2019 pp. 1-6.

Extended European Search Report issued on May 23, 2022 in counterpart European Patent Application No. 21211649.5 (7 pages in English).

Nguyen, Thai-Son, et al. "High performance sequence-to-sequence model for streaming speech recognition." *arXiv preprint arXiv:2003. 10022* vol. 2. (2020). pp 1-5.

* cited by examiner

METHOD AND APPARATUS WITH DECODING IN NEURAL NETWORK FOR SPEECH RECOGNITION

CROSS-REFERENCE TO RELATED APPLICATIONS

This application claims the benefit under 35 USC § 119(a) of Korean Patent Application No. 10-2021-0035353, filed on Mar. 18, 2021, in the Korean Intellectual Property Office, the entire disclosure of which is incorporated herein by reference for all purposes.

BACKGROUND

1. Field

The following description relates to a method and apparatus with decoding in a neural network for speech recognition.

2. Description of Related Art

Speech recognition may refer to technology for recognizing or understanding an acoustic speech signal such as a speech sound uttered by a human being by analyzing the acoustic speech signal with a computing device. Speech recognition may include, for example, recognizing a speech by analyzing a pronunciation using a hidden Markov model (HMM) that processes a frequency feature extracted from speech data using an acoustic model, or directly recognizing text such as a word or a sentence from speech data using an end-to-end type model constructed as an artificial neural network (ANN), without a separate acoustic model.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a decoding method includes: receiving an input sequence corresponding to an input speech at a current time; and in a neural network (NN) for speech recognition, generating an encoded vector sequence by encoding the input sequence, determining reuse tokens from candidate beams of two or more previous times by comparing the candidate beams of the previous times, and decoding one or more tokens subsequent to the reuse tokens based on the reuse tokens and the encoded vector sequence.

The determining of the reuse tokens may include: determining a reuse time of tokens at a current time n, being the current time, subsequent to a previous time n−1 subsequent to a previous time n−2 based on a comparison result between a candidate beam of the previous time n−2 and a candidate beam of the previous time n−1, wherein n is a natural number greater than or equal to "3"; and determining candidate beams accumulated up to the reuse time to be the reuse tokens.

The determining of the reuse time may include determining a time in which a largest number of substrings match in the candidate beam of the previous time n−2 and the candidate beam of the previous time n−1, as the reuse time of the tokens at the current time n.

The method may include storing either one or both of: a candidate beam having a highest probability among probabilities of candidate beams up to the reuse time; and a beam state corresponding to the candidate beam having the highest probability.

The decoding of the one or more tokens may include: determining candidate beams that are to be used for decoding of a next time, based on a probability of a combination of tokens at previous times of the decoding among the two or more previous times; and decoding the one or more tokens using one or more candidate beams corresponding to a reuse time of tokens among the candidate beams.

The decoding of the one or more tokens may include: inputting the one or more candidate beams corresponding to the reuse time of the tokens among the candidate beams to an auto-regressive decoder layer included in the NN; and decoding the one or more tokens.

The decoding of the one or more tokens may include, in response to the input speech not being ended, decoding the one or more tokens a preset number of times.

The decoding of the one or more tokens may include: predicting probabilities of token candidates subsequent to the reuse tokens based on the reuse tokens and the encoded vector sequence; and determining the one or more tokens based on the probabilities of the token candidates.

The generating of the encoded vector sequence may include generating the encoded vector sequence by encoding the input sequence using an encoder layer included in the NN.

The method may include, in the NN, generating a cumulative sequence by accumulating the input sequence corresponding to the input speech at the current time to input sequences of the previous times, wherein the generating of the encoded vector sequence may include generating the encoded vector sequence by encoding the cumulative sequence.

The NN may include an attention-based encoder-decoder model including an encoder layer and an auto-regressive decoder layer.

The method may include generating a speech recognition result of the input speech based on the decoded one or more tokens subsequent to the reuse tokens.

In another general aspect, one or more embodiments include a non-transitory computer-readable storage medium storing instructions that, when executed by a processor, configure the processor to perform any one, any combination, or all operations and methods described herein.

In another general aspect, a decoding apparatus with a neural network (NN) for speech recognition includes: a communication interface configured to receive an input sequence corresponding to an input speech at a current time; and a processor configured to use the NN to:
  generate an encoded vector sequence by encoding the input sequence; determine reuse tokens from candidate beams of two or more previous times by comparing the candidate beams of the previous times; and decode one or more tokens subsequent to the reuse tokens based on the reuse tokens and the encoded vector sequence.

For the determining of the reuse tokens, the processor may be configured to determine a reuse time of tokens at a current time n, being the current time, subsequent to a previous time n−1 subsequent to a previous time n−2 based on a comparison result between a candidate beam of the previous time n−2 and a candidate beam of the previous time n−1, wherein n is a natural number greater than or equal to "3", and determine candidate beams accumulated up to the reuse time to be the reuse tokens.

For the determining of the reuse tokens, the processor may be configured to determine a time in which a largest number of substrings match in the candidate beam of the previous time n−2 and the candidate beam of the previous time n−1, as the reuse time of the tokens at the current time n.

The decoding apparatus may include a memory configured to store candidate beams that are to be used for decoding of a next time, wherein, for the decoding of the one or more tokens, the processor may be configured to determine the candidate beams that are to be used for decoding of the next time, based on a probability of a combination of tokens at previous times of the decoding among the two or more previous times, and decode the one or more tokens using one or more candidate beams corresponding to a reuse time of tokens among the candidate beams.

For the decoding of the one or more tokens, the processor may be configured to input the one or more candidate beams corresponding to the reuse time of the tokens among the candidate beams to an auto-regressive decoder layer included in the NN, and decode the one or more tokens.

For the decoding of the one or more tokens, the processor may be configured to predict probabilities of token candidates subsequent to the reuse tokens based on the reuse tokens and the encoded vector sequence, and determine the one or more tokens based on the probabilities of the token candidates.

For the generating of the encoded vector sequence, the processor may be configured to generate the encoded vector sequence by encoding the input sequence using an encoder layer included in the NN.

The processor may be configured to use the NN to generate a cumulative sequence by accumulating the input sequence corresponding to the input speech at the current time to input sequences of the previous times, and for the generating of the encoded vector sequence, generate the encoded vector sequence by encoding the cumulative sequence.

In another general aspect, a decoding method includes: in a neural network (NN) for speech recognition, generating an encoded vector sequence by encoding an input sequence corresponding to an input speech at a current decoding time step, determining reuse tokens based on a largest sequence of tokens matching between candidate beams of previous time steps, and decoding one or more tokens subsequent to the reuse tokens based on the reuse tokens and the encoded vector sequence.

The determining of the reuse tokens may include determining, as the reuse tokens, portions of candidate beams of one of the previous time steps preceding the current time step up to a time corresponding to the largest sequence of tokens matching between the candidate beams of the previous time steps.

The largest sequence of tokens matching between candidate beams of previous decoding time steps is from an initial time step up to a time step previous to the current time step.

Other features and aspects will be apparent from the following detailed description, the drawings, and the claims.

Figure 1:
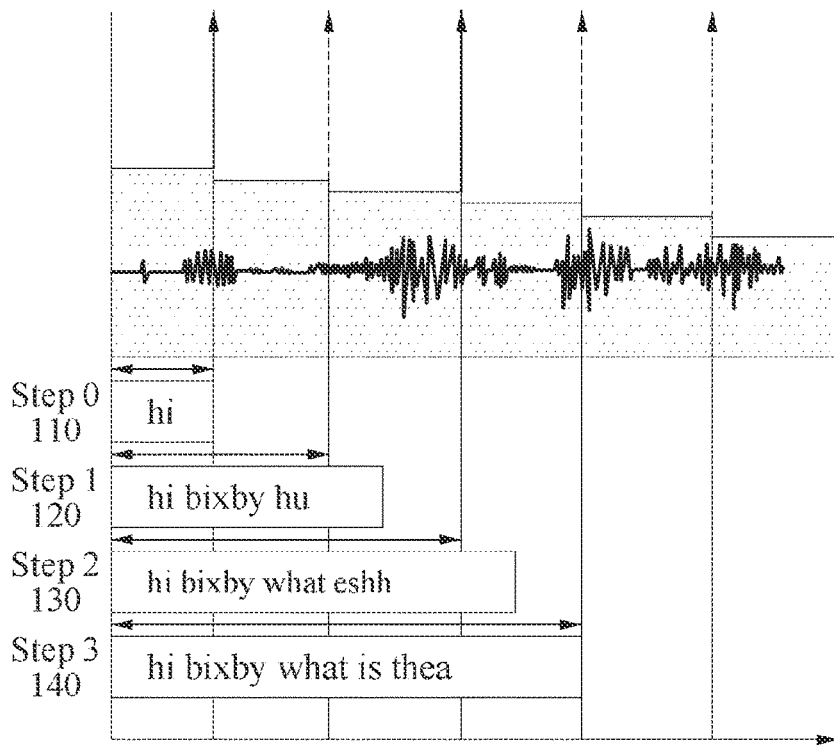
FIG. 1 illustrates an example of a process in which partial decoding for speech recognition is performed.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art, after an understanding of the disclosure of this application, may be omitted for increased clarity and conciseness.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

FIG. 1 illustrates an example of a process in which partial decoding for speech recognition is performed. FIG. 1 illustrates a process in which partial decoding is performed on an input speech, for example, "Hi Bixby, what is the weather like tomorrow?".

A speech recognition apparatus with an attention-based encoder-decoder structure may perform processing by applying a high weight directly to a predetermined portion of a sound source without information about an alignment between a wave file and a token, and may be quickly trained based on a large quantity of data due to easy parallelization. In an encoder-decoder structure, an encoder may receive a sound source and may convert the sound source to a sequence of an encoded vector that may be processed by a decoder. Also, the decoder may receive a token output decoded by the decoder again, together with the vector encoded by the encoder, based on an auto-regressive scheme of receiving tokens decoded up to previous times again, and may predict a probability of a token that is to be output in a next time.

The speech recognition apparatus may repeat a decoding step of receiving a start token as an input, receiving an output decoded by the decoder again, and predicting a next token, may output an end token when an entire sentence ends, and may terminate the decoding step.

As described above, to achieve responsiveness showing that a user's speech command is immediately processed in speech recognition, a speech recognition apparatus of one or more embodiments may perform streaming to output an intermediate result while a speech is being input. In contrast, when all sound sources to be decoded in an attention-based encoder-decoder speech recognition model are input and started to be decoded at once by a typical speech recognition apparatus, the typical speech recognition apparatus may not perform streaming to output the intermediate result while the speech is being input, and thus a user may feel dissatisfaction with the resulting poor responsiveness. Accordingly, since responsiveness showing that a user's speech command is immediately processed improves speech recognition, speech recognition apparatus of one or more embodiments may perform streaming to output a recognition result while a speech is being input.

For streaming of outputting a decoding result while a speech is being input, a partial decoding scheme of decoding sound sources accumulated at regular intervals while continuously input sound sources are continuing to be accumulated in a buffer may be used.

For example, partial decoding may be performed on sound sources accumulated at extremely short intervals (for example, 300 milliseconds (msec)) for natural decoding. In this example, partial decoding may be performed to be "hi" in a step 0 110, "hi bixby hu" in a step 1 120, "hi bixby what esh" in a step 2 130, and "hi bixby what is thea" in a step 3 140.

When the partial decoding is performed as shown in FIG. 1, a length of a sound source to be added for each step decreases when a number of decoding steps increases. However, since an overall operation needs to be reperformed on all inputs accumulated each time, a relatively large amount of processing time may be consumed. Also, since an end portion of a speech being input is suddenly cut (for example, "hu" in the step 1 120, "esh" in the step 2 130, and "thea" in the step 3 140) every 300 msec, an inaccurate intermediate decoding result may be output.

In addition, since an amount of processing time used is in proportion to a number of repetitions of the decoding step, as the length of the sound source increases, a large amount of processing time may be used and thus partial decoding may not be terminated before 300 msec at which a next decoding step starts. In particular, partial decoding of a last portion of a sound source may be started when the sound source is completely ended. In this example, when a previous time in which a sound source is accumulated is not completely used even though the partial decoding is used, a final latency between a sound source end time and a time at which a final speech decoding result is received may increase.

Figure 2:
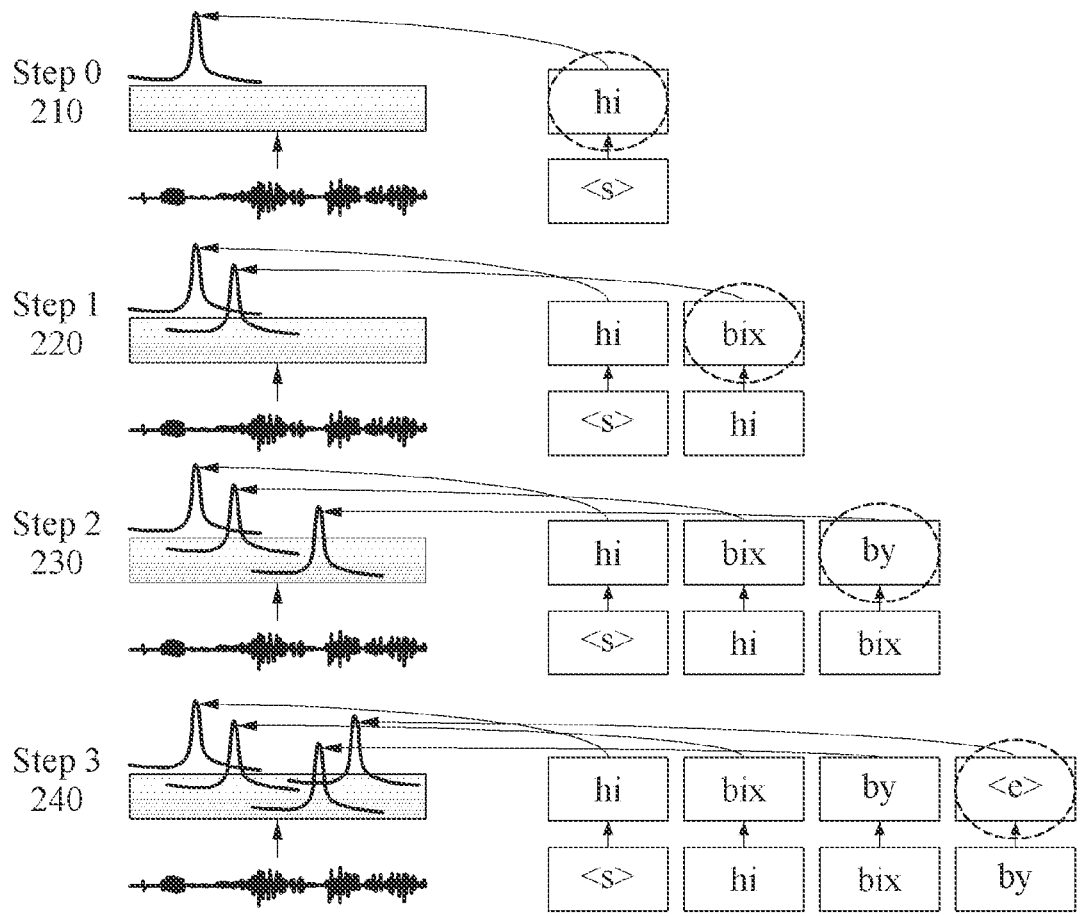
FIG. 2 illustrates an example of an operation of a decoding apparatus.

FIG. 2 illustrates an example of an operation of a decoding apparatus. FIG. 2 illustrates an auto-regressive decoding process of an input speech, for example, "hi, bixby".

The decoding apparatus may focus on an input speech of a speaker by performing auto-regressive decoding in which a previous output of an artificial neural network (ANN) is used as an input for each token and a next output continues to be output, to calculate an output with an unspecified length. The term "token" used herein may indicate a unit forming one sequence, and the unit may include, for example, a word, a subword, a substring, a character, or a unit forming a single character (for example, an initial consonant and a vowel or a consonant placed under a vowel in the Korean alphabet).

For example, an input speech "hi, bixby" may be sequentially input. In this example, the decoding apparatus input may repeat a decoding step of an input speech through auto-regressive decoding as shown in FIG. 2, to receive an output of a previous step every step and find a token of a next step. In the auto-regressive decoding, an output token of a previous step may have an influence on determining of an output token of a next step.

In an example, an ANN of an encoding apparatus may include, for example, an attention-based encoder-decoder speech recognition model. The encoding apparatus may perform decoding using a partial decoding scheme of repeatedly decoding sound sources accumulated at regular intervals while continuously input sound sources are continuing to be accumulated in a buffer.

The decoding apparatus may terminate a previous decoding step before partial decoding of a next step is started, and may immediately perform decoding while a user is speaking a speech command using the attention-based encoder-decoder speech recognition model without a special training scheme or a structural change for streaming.

In a step 0 210, the decoding apparatus may perform partial decoding on "hi" together with a start token <s> that indicates a start of an input speech. The decoding apparatus may focus on "hi" by assigning a high weight to a portion corresponding to "hi" in a sound source and may decode the sound source.

In a step 1 220, the decoding apparatus may perform partial decoding on "bix" subsequent to "hi". The decoding apparatus may focus on a portion corresponding to "bix" and may decode the sound source.

Similarly, in a step 2 230, the decoding apparatus may perform partial decoding by focusing on "by" subsequent to "bix".

In a step 3 240, the decoding apparatus may decode an end token <e> that is subsequent to "by" and that indicates a last portion of the input speech.

When partial decoding is performed, the decoding apparatus of one or more embodiments may immediately find a last token with the end token <e> from an input speech shifted rightwards by a start token <s>, instead of needing to sequentially perform an operation during training, which may be advantageous in parallelization. When an output up to a predetermined step is exactly known during inference, the decoding apparatus may predict a token of a step immediately subsequent to the step as if continuing to perform decoding.

A decoding result may change due to an incorrect prediction or a new token included in a newly accumulated sound source in the vicinity of the sound source in a partial decoding result. However, as shown in FIG. 2, a decoding result of a front portion in which a sufficiently large number of sound sources are accumulated may hardly change. Also, a decoder capable of performing training in parallel may not need to start auto-regressive decoding at a start token only, and may predict a probability of a token to be output in a next step when a token sequence is received as an input.

Based on the above description, the decoding apparatus of one or more embodiments may reuse a token corresponding to a stable portion of a previous partial decoding result in each partial decoding, and thus the decoding apparatus of one or more embodiments may reduce a processing load used to process a front portion repeated in an auto-regressive decoding step. The above scheme may be called "relay decoding", in that a result of a previous decoding step may be reused in a next decoding step similarly to a relay running in which a previous runner passes a baton to a next runner.

Also, in an example, a number of repetitions of a decoding step in auto-regressive decoding may be limited to a preset number of times, and thus the decoding apparatus of one or more embodiments may reduce a load used to process a back portion of the decoding step in each partial decoding. By reducing a total number of decoding steps of each partial decoding, the decoding apparatus of one or more embodiments may reduce a total number of operations and a time used in each decoding step. The above scheme may be called "limited relay decoding", in that a number of repetitions of partial decoding may be limited in addition to the above-described relay decoding.

Figure 3:
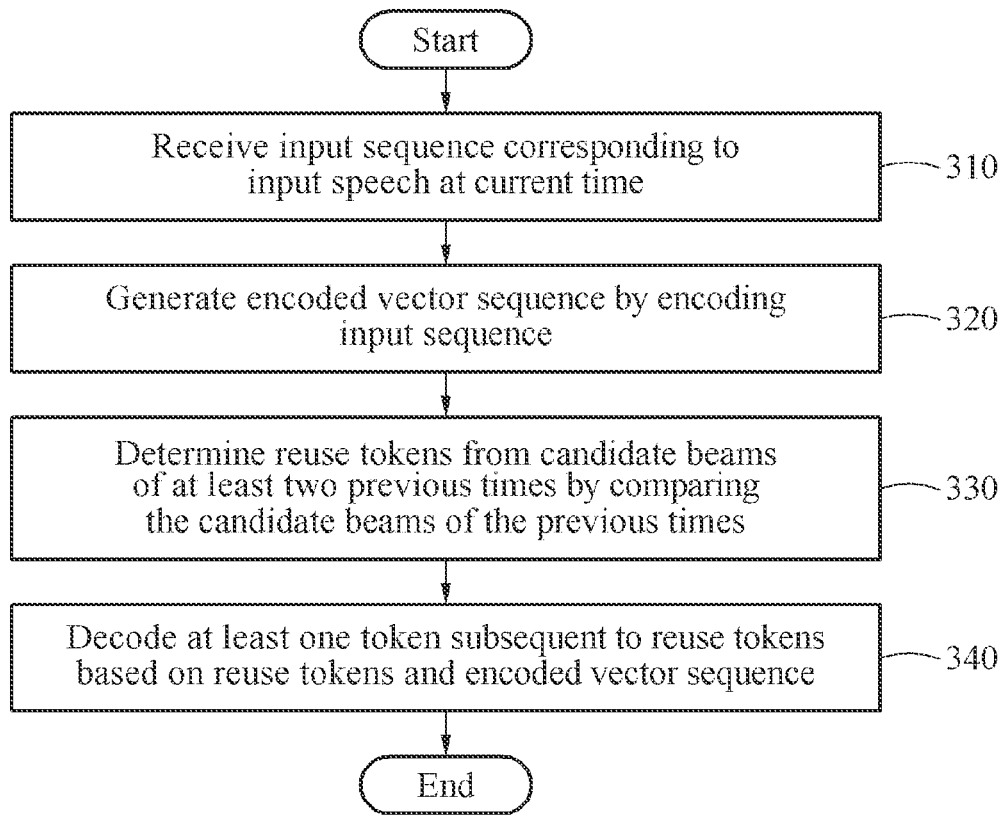
FIG. 3 illustrates an example of a decoding method.

FIG. 3 illustrates an example of a decoding method. FIG. 3 illustrates a process in which a decoding apparatus outputs at least one token for an input speech at a current time by an ANN for speech recognition through operations 310 to 340.

The ANN may include, for example, an attention-based encoder-decoder model that includes an encoder layer and an auto-regressive decoder layer.

For example, the ANN may include a self-attention neural network (SANN), a recurrent neural network (RNN), a convolutional neural network (CNN), a bi-directional RNN (BRNN), a long short-term memory (LSTM), a bi-directional LSTM (BLSTM), a gated recurrent unit (GRU), and/or a bi-directional GRU (BGRU), but is not limited thereto.

The ANN may receive an input feature vector corresponding to an input speech and may output a recognition result corresponding to the input feature vector. Nodes of layers in the ANN may affect each other in a nonlinear relationship, and parameters of the ANN (for example, values output from each of the nodes or relationships between the nodes) may be optimized through training.

The ANN may receive an input at one end, may generate an output at another end, and may optimize a network weight based on the input and the output. For example, the ANN may include an encoder layer and an auto-regressive decoder layer. The encoder layer and the decoder layer may be referred to as an "encoder" and a "decoder", respectively. In the following description, the terms "encoder layer" and "encoder" may be interchangeably used with respect to each other, and the terms "decoder layer" and "decoder" may be interchangeably used with respect to each other.

The ANN may be, for example, an ANN with an encoder-decoder structure. In the ANN, all parameters of a neural network model may be simultaneously or separately trained for a single loss function. When all the parameters of the neural network model are simultaneously trained for a single loss function, the encoder and decoder may be trained at the same time.

The encoder and the decoder may be pre-trained to generate a sequence of a recognition result from a received feature vector. For example, the encoder and the decoder may be pre-trained to generate a sequence of a recognition result from a sequence of a correct answer text pair corresponding to an input speech.

In operation 310, the decoding apparatus may receive an input sequence corresponding to an input speech at a current time. The input speech may include, for example, a wave file that represents an input speech signal in a form of a wave, a spectrogram that represents a wave file in a form of a frequency, or a mel-frequency cepstral coefficient (MFCC). The input sequence may include an input speech, and an input speech feature vector extracted from the input speech. The input sequence may correspond to a signal cut to be processed by an ANN.

In operation 320, the decoding apparatus may generate an encoded vector sequence by encoding the input sequence received in operation 310. The decoding apparatus may encode the input sequence using an encoding layer included in the ANN, to generate the encoded vector sequence. The encoder layer may generate an encoded feature (for example, the encoded vector sequence) by encoding the received input sequence. For example, the encoder layer may also generate encoded information by transforming a dimension of a feature vector. The encoded feature (for example, the encoded vector sequence) generated by the encoder layer may be applied to the decoder. The encoder layer may sequentially receive and encode the input sequence and transmit the input sequence to the decoder layer, and the decoder layer may receive an encoding result (e.g., a result of the encoding) and sequentially output speech-recognized words one by one based on the encoding result.

In operation 320, the decoding apparatus may generate a cumulative sequence in which the input sequence corresponding to the input speech at the current time is accumulated to input sequences of previous times. The decoding apparatus may generate the encoded vector sequence by encoding the cumulative sequence.

In operation 330, the decoding apparatus may determine reuse tokens from candidate beams of at least two previous times by comparing the candidate beams of the previous times. The decoding apparatus may determine a reuse time of tokens at a current time n subsequent to a previous time n−1 subsequent to the previous time n−2 based on a comparison result between a candidate beam of the previous time n−2 and a candidate beam of the previous time n−1, where n may be a natural number greater than or equal to "3". For example, the decoding apparatus may determine a time in which a large number of substrings are matched between the candidate beam of the previous time n−1 and the candidate beam of the previous time n−2 as the reuse time of the tokens at the current time n. The reuse time may also be referred to as a "stable time", in that a decoding result may remain unchanged and stable. In the following description, the terms "reuse time" and "stable time" may be interchangeably used with respect to each other. In an example, the previous time n−2 may be a time corresponding to an (n−2)-th decoding step, the previous time n−1 may be a time corresponding to an (n−1)-th decoding step, and the current time n may be a time corresponding to an n-th decoding step. In the following description, the previous time n−2 and the (n−2)-th decoding step may be interchangeably used, and the previous time n−1 and the (n−1)-th decoding step may be interchangeably used, and the current time n and the n-th decoding step may be interchangeably used.

The decoding apparatus may determine candidate beams accumulated up to the reuse time to be the reuse tokens. When an encoded feature is received from an auto-regressive encoder layer, the decoder layer may output a recognition result in units of tokens. The auto-regressive decoder layer may generate an output token depending on input tokens selected up to a previous step. The decoding apparatus may determine a token selected as an output token to be a next input token. The decoding apparatus may use a reuse token when outputting a token of a next step in each decoding step using the auto-regressive decoder layer. For example, the auto-regressive decoder layer may use an output "weather" when recognizing "How" in a sentence "How is the weather?". A non-limiting example in which the decoding apparatus determines reuse tokens will be further described below with reference to FIGS. 5 and 6.

In operation 340, the decoding apparatus may decode at least one token subsequent to the reuse tokens determined in operation 330 based on the reuse tokens and the vector sequence generated in operation 320. For example, the decoding apparatus may determine candidate beams that are to be used for decoding of a next time based on a probability of a combination of tokens at previous times of decoding. The decoding apparatus may decode at least one token using at least one candidate beam corresponding to a reuse time of tokens among the candidate beams. In this example, the candidate beams may correspond to candidate beams that are to perform a beam search at a next time. The decoding apparatus may decode at least one token using the at least one candidate beam corresponding to the reuse time of the tokens among the candidate beams. The decoding apparatus may determine at least one candidate beam corresponding to the reuse time of the tokens by a beam search algorithm that reuses candidate beams having high probabilities among the candidate beams. The decoding apparatus may store candidate beams that are to be used for decoding of a next time for each previous time of decoding. For example, the decoding apparatus may store at least one of a candidate beam having a highest probability among probabilities of candidate beams up to the reuse time, and a beam state corresponding to the candidate beam having the highest probability. A non-limiting example of the beam state will be described below.

The decoding apparatus may decode at least one token by inputting the at least one candidate beam corresponding to the reuse time of the tokens among the candidate beams to the auto-regressive decoder layer included in the ANN. The auto-regressive decoder layer may perform auto-regressive decoding to determine an output token based on tokens that are recognized up to a previous step, for each token. The decoding apparatus may calculate an output token based on information calculated from the encoder layer for each step. The output token may be dependent on input tokens selected up to previous steps.

In operation 340, the decoding apparatus may predict token candidates subsequent to the reuse tokens based on the reuse tokens and the vector sequence. The decoding apparatus may determine at least one token based on probabilities of the token candidates. The decoding apparatus may determine a token candidate having a highest probability among the token candidates as a finally decoded token.

For example, when the input speech is not ended, the decoding apparatus may decode at least one token a preset number of times. The preset number of times may be, for example, three times or five times. Since all auto-regressive decoding steps do not need to be completely performed when a speech is not ended, the decoding apparatus may reduce a decoding time by performing decoding steps a limited number of times. In this example, the decoding apparatus may store a candidate beam for each decoding step and/or a beam state of the candidate beam. A non-limiting example in which the decoding apparatus decodes at least one token will be further described below with reference to FIGS. 7 and 8.

Figure 4:
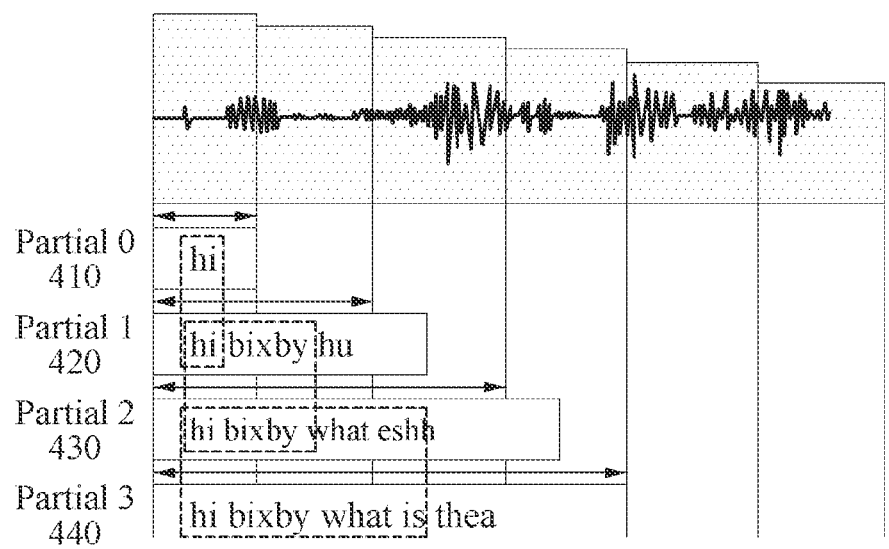
FIG. 4 illustrates an example of a decoding method in an artificial neural network (ANN) for speech recognition.

FIG. 4 illustrates an example of a decoding method in an ANN for speech recognition. FIG. 4 illustrates an example in which a decoding apparatus decodes an input speech "Hi Bixby, what is the weather like tomorrow?" by reuse tokens.

For example, "hi" may be determined to be received in a partial decoding step 0 410. Since two partial decoding steps immediately preceding the partial decoding step 0 410 are absent, the decoding apparatus may perform auto-regressive decoding on "hi" without a candidate beam.

It may be determined that "hi bixby hu" is received in a partial decoding step 1 420. Similarly, the decoding apparatus may perform auto-regressive decoding on "hi bixby hu" without a candidate beam, because two partial decoding steps immediately preceding the partial decoding step 1 420 are absent.

It may be determined that "hi bixby what eshh" is received in a partial decoding step 2 430. The decoding apparatus may generate candidate beams corresponding to "hi bixby what eshh" of the partial decoding step 2 430 (for example, candidate beams of an (n−2)-th partial decoding step 510 of FIG. 5).

In addition, it may be determined that "hi bixby what is thea" is received in a partial decoding step 3 440. The decoding apparatus may generate candidate beams corresponding to "hi bixby what is thea" of the partial decoding step 3 440 (for example, candidate beams of an (n−1)-th partial decoding step 530 of FIG. 5).

The decoding apparatus may determine, as a reuse time, a time (for example, 690 msec) in which a largest number of substrings match in the candidate beams corresponding to "hi bixby what eshh" and the candidate beams corresponding to "hi bixby what is thea". The decoding apparatus may determine candidate beams ("hi bixby what") accumulated up to the reuse time to be a reuse token.

The decoding apparatus may determine a reuse token corresponding to a stable time (that is, a reuse time) by comparing partial decoding results of previous times, as described above. Also, the decoding apparatus may regard a candidate beam of the reuse time as a stable candidate beam and may use the candidate beam as an input of a decoder instead of a start token. The decoding apparatus may start decoding using reuse tokens to predict a token of a next step as if auto-regressive decoding continues to be performed from a start token.

The decoding apparatus may recalculate a probability of a candidate beam that is to be used when a beam search is started from a stable candidate beam and a newly accumulated sound source in a next partial decoding step. For example, a hidden state used for an attention calculation may be calculated at once without a need to repeat multiple decoding steps through a matrix operation, similar to training of the ANN.

Figure 5:
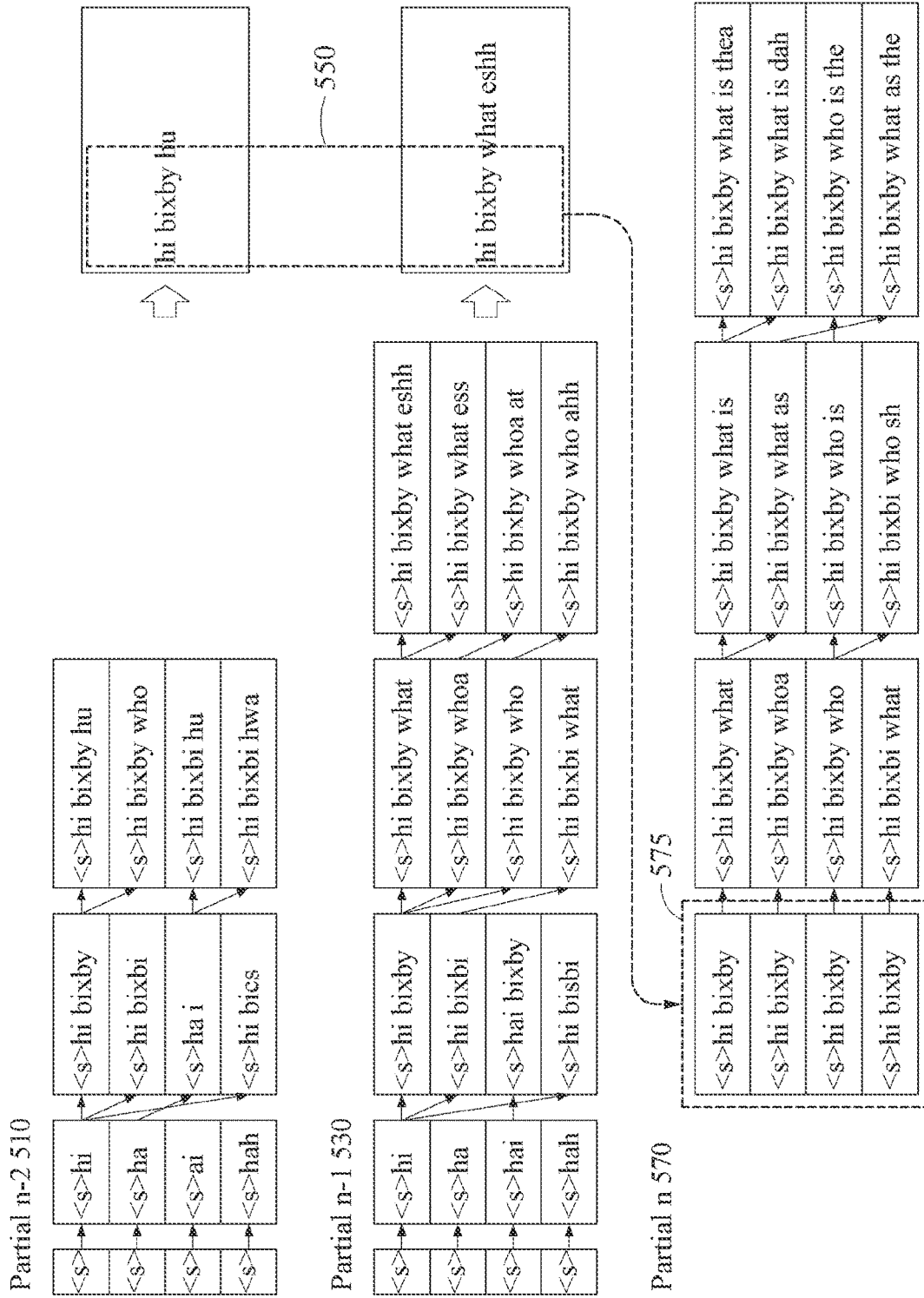
FIGS. 5 and 6 illustrate examples of determining reuse tokens.

FIG. 5 illustrates an example of determining reuse tokens. FIG. 5 illustrates a process of determining reuse tokens instead of using a beam search algorithm.

When a decoding apparatus receives its output again by an auto-regressive scheme and predicts a probability of a next token for all reuse tokens, all possible combinations may be compared.

For example, a current time may be assumed to correspond to an n-th partial decoding step 570 among partial decoding steps. In this example, the decoding apparatus may determine a candidate beam (for example, <s> hi bixby) up to a third token that corresponds to a time in which a largest number of substrings match in output results (for example, candidate beams) of two steps (for example, the (n−2)-th partial decoding step 510 and the (n−1)-th partial decoding step 530) immediately preceding the n-th partial decoding step 570, as a stable candidate beam.

The decoding apparatus may determine the stable candidate beam "<s> hi bixby" 550, instead of a start token <s>, as a reuse token when the n-th partial decoding step 570 is started by the above-described relay decoding, and may use the stable candidate beam "<s> hi bixby" 550 as an input 575 of a decoder. The decoding apparatus may copy the candidate beam "<s> hi bixby" 550 to the input 575 of the decoder.

In the n-th partial decoding step 570, the decoding apparatus may recalculate a probability of a candidate beam that is to be used for a beam search from the candidate beam "<s> hi bixby" 550 and a newly accumulated sound source (for example, "what").

However, when the same portion (for example, up to the third token (<5> hi bixby)) is determined as the candidate beam 550 and is completely copied to the input 575 of the decoder during auto-regressive decoding, similar to the n-th partial decoding step 570, a size of a beam may be reduced to "1" for each partial decoding step, which may lead to a decrease in performance.

Figure 6:
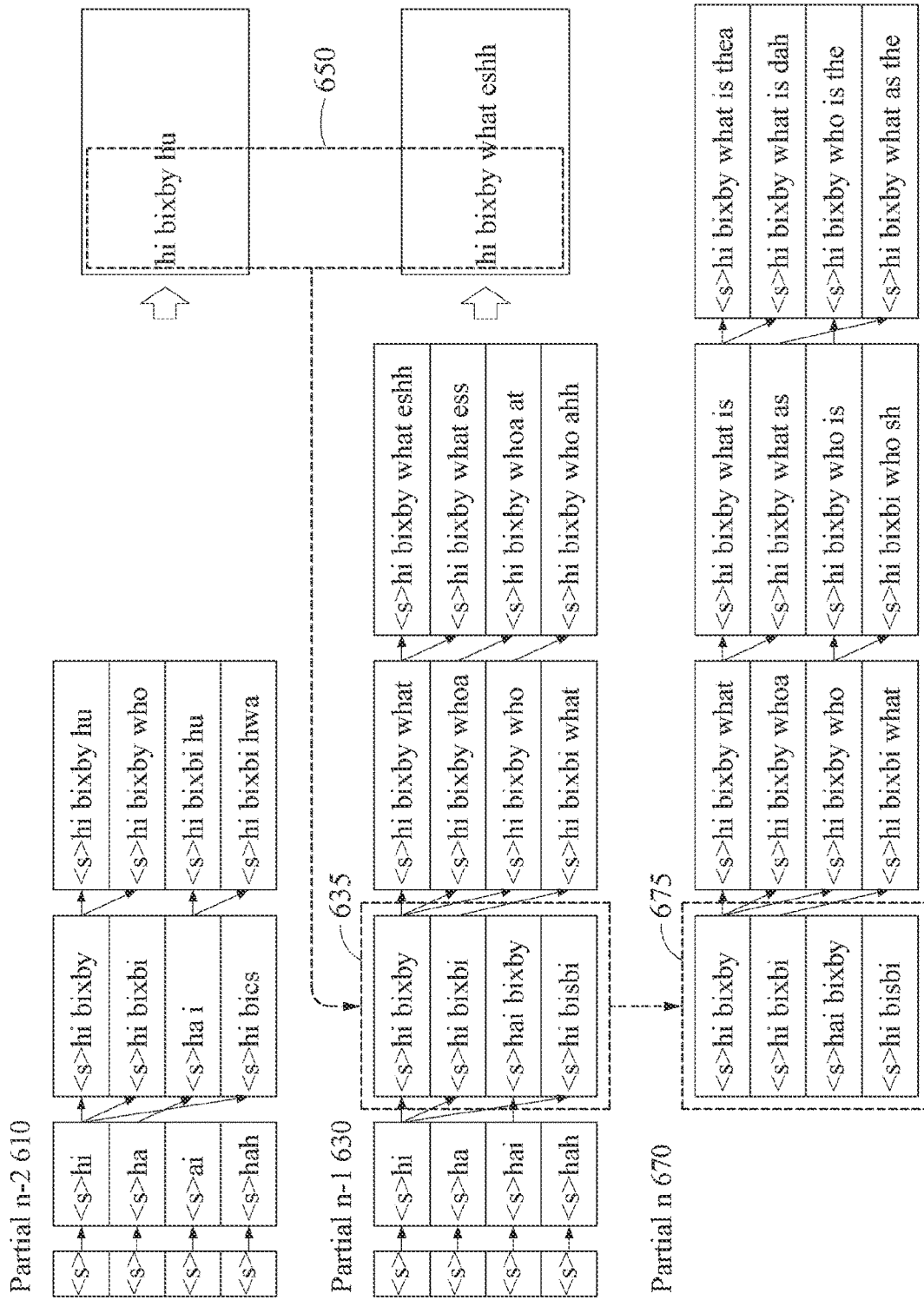

FIG. 6 illustrates another example of determining reuse tokens. FIG. 6 illustrates a process of determining a reuse token using a beam search algorithm.

In an example, probabilities of combinations of a maximum number of tokens may be calculated using a beam search algorithm that uses top several token candidates having high probabilities among tokens as inputs again, and a correct answer similar to an optimum may be found among the probabilities. Thus, the decoding apparatus of one or more embodiments may prevent performance from decreasing due to a reduction in a size of a beam to "1" for each partial decoding step.

For example, when a decoding step is unconditionally repeated in a state in which candidate beams having a highest probability are maintained, a predicted probability of an output token may gradually decrease. When a token candidate or a candidate beam having a higher probability than a candidate beam currently having a highest probability fails to be found, the decoding apparatus may terminate the beam search algorithm and may output a candidate beam having a highest probability among found candidate beams as a final decoding result.

For example, a current time may be assumed to correspond to an n-th step 670 among partial decoding steps. The decoding apparatus may regard a candidate beam (for example, <s> hi bixby) up to a third token that corresponds to a time in which a largest number of substrings match in output results (for example, candidate beams) of two partial decoding steps (for example, an (n−2)-th step 610 and an (n−1)-th step 630) immediately preceding the n-th step 670, as a stable candidate beam. In this example, the decoding apparatus may store a beam state corresponding to a result obtained by performing the beam search algorithm for each immediately preceding partial decoding step. The beam state may indicate sequences (hereinafter, referred to as "beams") input to a decoder layer in auto-regressive decoding. The decoder layer may output probabilities of all tokens (for example, the same number of tokens as a product of beams and a total number of tokens) obtained in a current step. When a probability of an original beam is multiplied by a probability of a token output at the current step, a probability of a sentence that is output up to the current step may be obtained. The decoding apparatus may extract the same number of tokens as a size of a beam in a descending order of probabilities among sentences that are increased by one token, and may use the extracted tokens as a beam to be input to the decoder layer in a next auto-regressive decoding step. Since the decoding apparatus selects a fixed number every time, the expression "beam search" may be used due to a constant width.

The beam state may correspond to a result of extracting a preset number of tokens in a descending order of probabilities among sentences that are increased by one token for each decoding step, as described above. Generally, a token finally applied to the decoder layer in a next decoding step may also be called a beam. However, in an example, a preset number of tokens may be stored in a descending order of probabilities in each step and the stored tokens may be called a "beam state".

The decoding apparatus may store a beam state of the (n−2)-th step 610 and a beam state 635 of the (n−1)-th step 630.

When a position of a stable time is determined as, for example, a position up to the third token by comparing outputs of two immediately preceding partial decoding steps, the decoding apparatus may directly use the beam state 635 of the (n−1)-th step 630 corresponding to the position of the stable time, for relay decoding.

The decoding apparatus may use the beam state 635 that is a result obtained by performing the beam search algorithm up to the position of the stable time (for example, the third token) as an input 675 of a decoder, instead of a start token <s>, when the n-th step 670 is started.

In the n-th step 670, the decoding apparatus may recalculate a probability of a candidate beam that is to be used for a beam search from the input 675 and a newly accumulated sound source (for example, "what").

Figure 7:
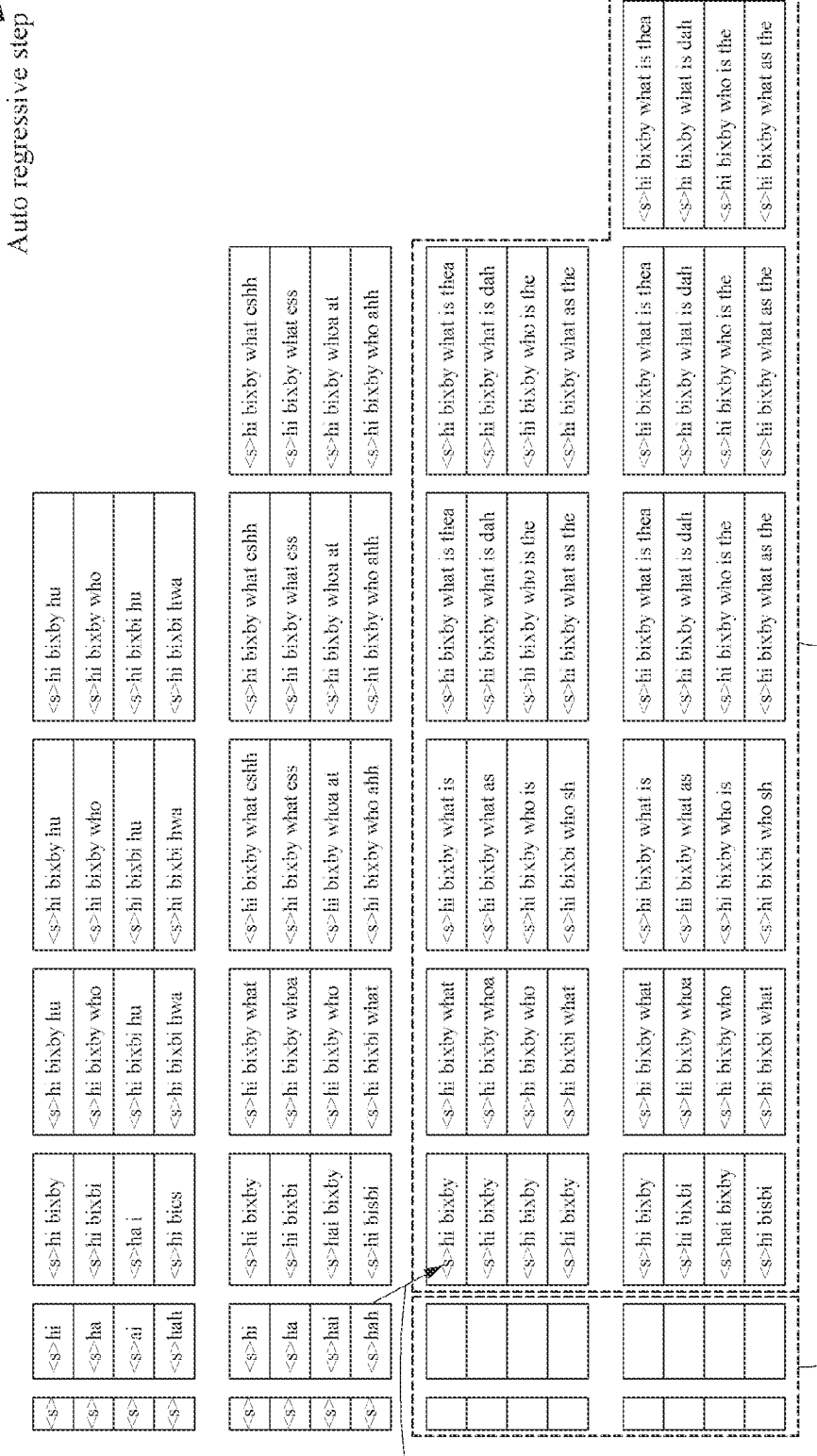
FIGS. 7 and 8 illustrate examples of a decoding method.

FIG. 7 illustrates an example of a decoding method. FIG. 7 illustrates an example 700 in which a number of times a partial decoding step is performed is reduced through the above-described relay decoding.

In an example, through the above-described relay decoding, tokens corresponding to a stable time may be reused, instead of a start token, in a next step, as indicated by an arrow 710 in the example 700, thereby reducing execution of preceding steps 730 corresponding to the stable time during partial decoding. A decoding apparatus may perform auto-regressive steps 750 other than the preceding steps 730 in each partial decoding.

Figure 8:
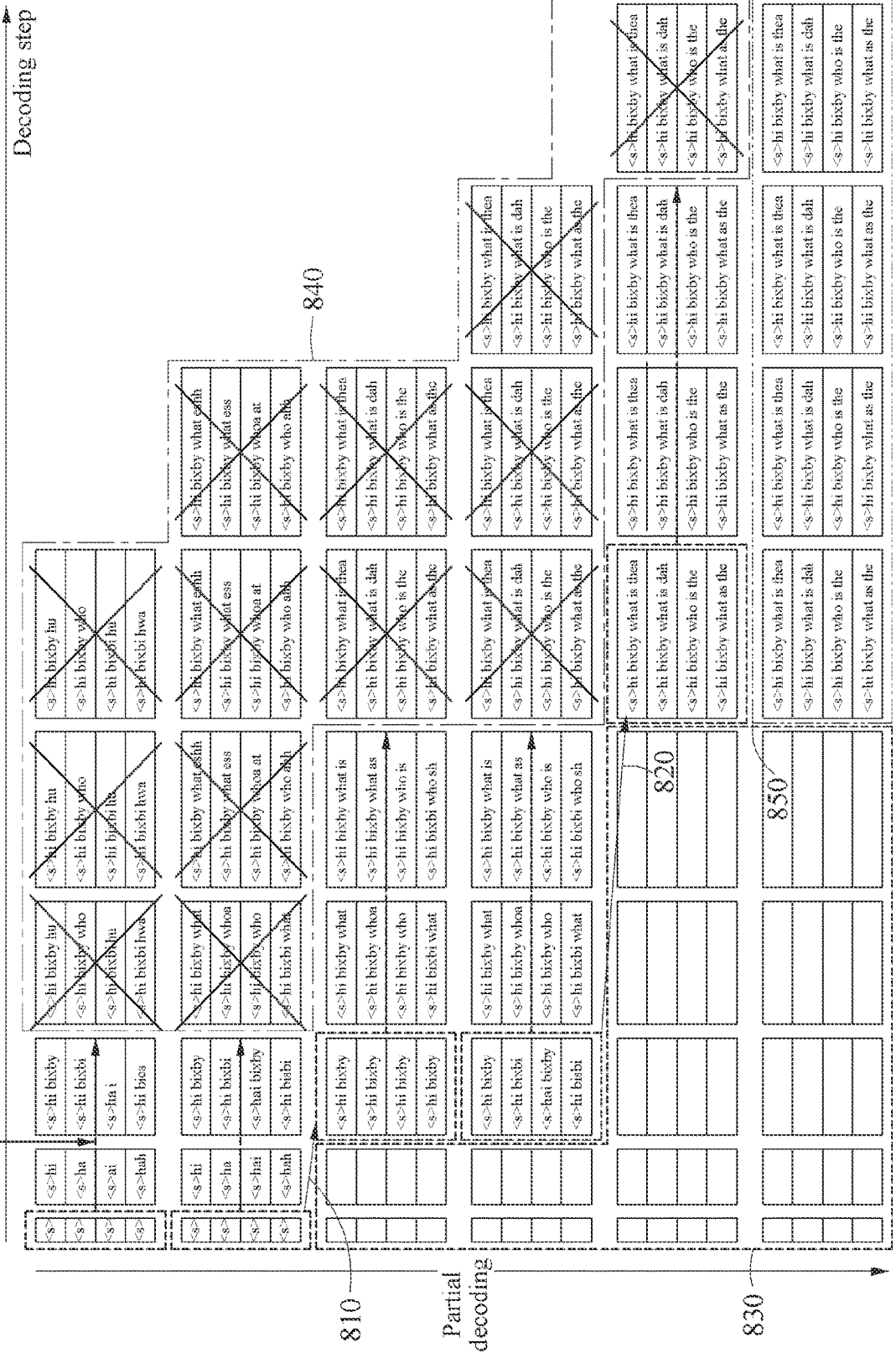

FIG. 8 illustrates another example of a decoding method. FIG. 8 illustrates an example 800 in which a number of times a partial decoding step is performed is reduced through the above-described limited relay decoding.

Similar to the description of FIG. 7, a decoding apparatus may reuse tokens corresponding to a stable time, instead of a start token, in a next step, as indicated by arrows 810 and 820 in the example 800, thereby reducing execution of preceding steps 830 corresponding to the stable time during partial decoding.

Also, the decoding apparatus may limit a number of repetitions of auto-regressive steps other than the preceding steps 830 in each partial decoding to, for example, three times or five times, and may not perform decoding in a following step 840 that exceeds the limited number.

For example, during training, a training sample may temporally include a silence back and forth due to a recording environment. In a sound source that is suddenly cut, the silence may be determined as a stable time, and accordingly a decoding result of a portion neighboring a cut-off portion may not be accurate. Also, it may be difficult to speak at least two or three tokens within 300 milliseconds (ms) that is one unit in which partial decoding is performed, at a normal speech rate of a person. Thus, a number of reuse tokens that may be additionally obtained in one partial decoding may not exceed a predetermined number of tokens.

In an example, when a sound source input is not ended and is accumulated, a number of repetitions of auto-regressive steps may be limited to three, the auto-regressive steps may be repeated three times after the preceding steps 830 and the following step 840 that exceeds the limited number of repetitions may be performed, which may lead to a reduction in a memory and a processing load.

In another example, when a sound source input is ended, the decoding apparatus may perform decoding up to an end of the sound source based on an end condition of an original beam search algorithm in a last partial decoding step 850 after the sound source input is ended.

Figure 9:
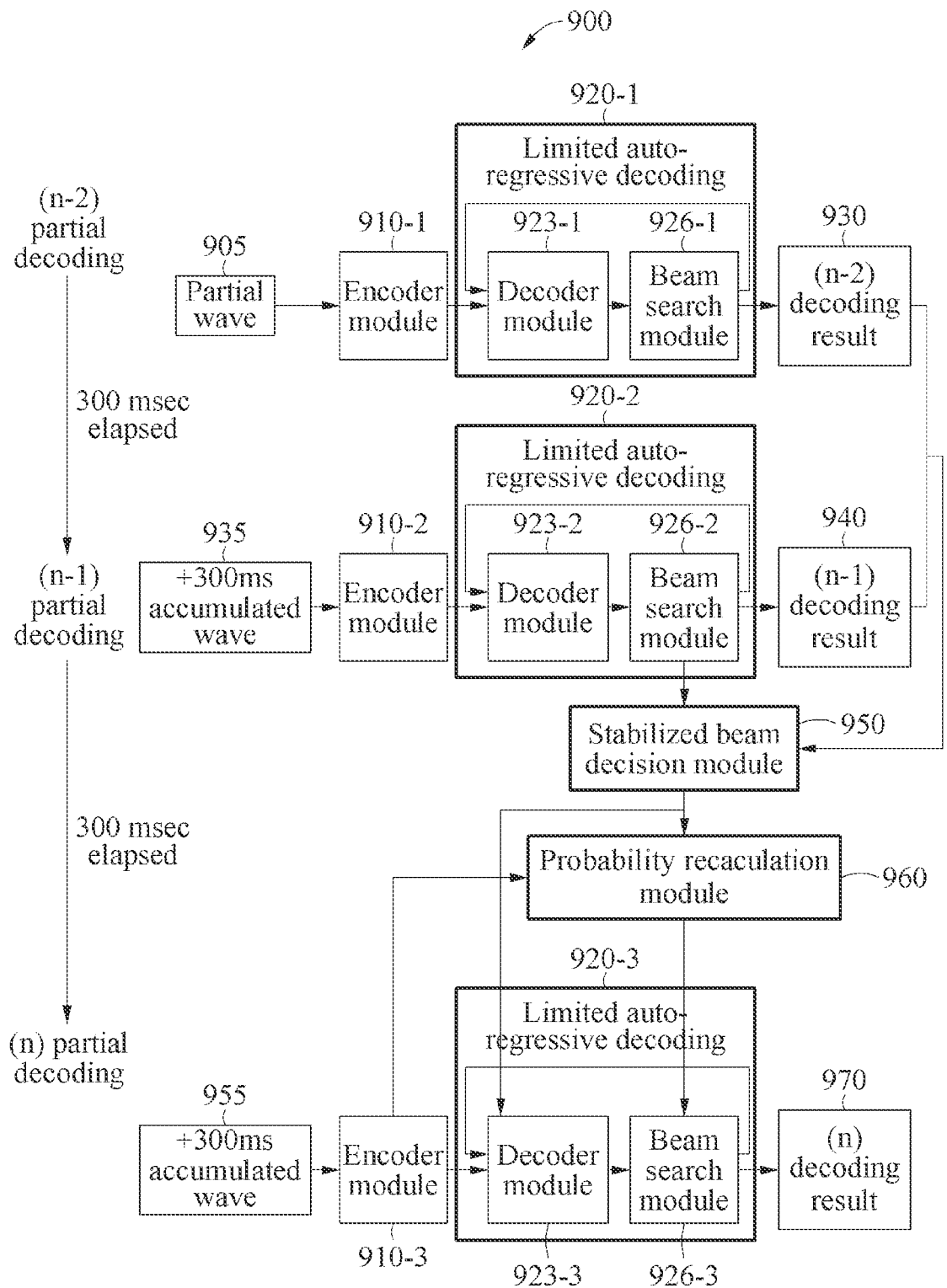
FIG. 9 illustrates an example of an operating process of a decoding apparatus.

FIG. 9 illustrates an example of an operating process of a decoding apparatus. Referring to FIG. 9, a decoding apparatus 900 may include an encoder module 910 including an encoder layer, a limited auto-regressive decoding module 920 (hereinafter, referred to as a "decoding module 920"), a stabilized beam decision module 950, and a probability recalculation module 960.

The decoding module 920 may include a decoder module 923, and a beam search module 926. The beam search module 926 may determine at least one candidate beam corresponding to a reuse time of tokens by a beam search algorithm that reuses candidate beams having high probabilities among candidate beams. The decoder module 923 may decode at least one token by inputting the at least one candidate beam corresponding to the reuse time of the tokens determined by the beam search module 926 among the candidate beams to the beam search module 926.

For example, in an (n–2)-th partial decoding step, an input sequence 905 in a form of a partial wave corresponding to an input speech of a speaker may be assumed to be received.

The decoding apparatus 900 may generate an encoded vector sequence by encoding the input sequence 905 using an encoder module 910-1. The encoded vector sequence may be transferred to a decoding module 920-1. The encoded vector sequence may be applied to a decoder module 923-1 and may be decoded. A decoding result of the decoder module 923-1 may be transferred to a beam search module 926-1. The beam search module 926-1 may determine a candidate beam having a highest probability among candidate beams corresponding to the decoding result of the decoder module 923-1 by the beam search algorithm. The candidate beam having the highest probability may be output as a decoding result 930 of the (n–2)-th partial decoding step, and may be reinput to the decoder module 923-1 for auto-regressive decoding.

In an (n–1)-th partial decoding step after 300 msec elapses, an input sequence 935 in a form of a partial wave corresponding to an input speech of a speaker may be assumed to be received. The input sequence 935 may be obtained by additionally accumulating a subsequent input speech corresponding to 300 msec to the input sequence 905.

The decoding apparatus 900 may generate an encoded vector sequence by encoding the input sequence 935 using an encoder module 910-2. The encoded vector sequence may be transferred to a decoding module 920-2. The encoded vector sequence may be applied to a decoder module 923-2 and may be decoded. A decoding result of the decoder module 923-2 may be transferred to a beam search module 926-2. The beam search module 926-2 may determine a candidate beam having a highest probability among candidate beams corresponding to the decoding result of the decoder module 923-2 by the beam search algorithm. The candidate beam having the highest probability may be output as a decoding result 940 of the (n–1)-th partial decoding step, and may be reinput to the decoder module 923-2 for auto-regressive decoding.

Since there are no two partial decoding steps immediately preceding the (n–2)-th partial decoding step and the (n–1)-th partial decoding step, the decoding apparatus 900 may execute general auto-regressive decoding a limited number of times (for example, three or five times) without a candidate beam.

The decoding apparatus 900 may store all candidate beams that are to be reinput to the decoder module 923 for auto-regressive decoding when performing the beam search algorithm in each partial decoding step. Also, the decoding apparatus 900 may store all beam states corresponding to results obtained by performing the beam search algorithm for each decoding step.

For example, the stabilized beam decision module 950 may compare decoding results of two immediately preceding steps, for example, the decoding result 930 of the (n–2)-th partial decoding step and the decoding result 940 of the (n–1)-th partial decoding step, and may determine a time in which a largest number of substrings match as a stable decoding step.

The stabilized beam decision module 950 may call a candidate beam corresponding to the stable decoding step among stored candidate beams, or a beam state corresponding to results obtained by performing the beam search algorithm in the two immediately preceding steps, according to execution of the two immediately preceding steps, and may provide the called candidate beam or the called beam state to a decoder module 923-3. The decoding apparatus 900 may start an n-th partial decoding step from the called candidate beam or the called beam state.

In the n-th partial decoding step, the decoding apparatus 900 may generate an encoded vector sequence by encoding an input sequence 955 using an encoder module 910-3. The encoder module 910-3 may transfer the encoded vector sequence generated by encoding the input sequence 955 to the probability recalculation module 960.

Since the input sequence 955 is increased by 300 milliseconds (ms) compared to the (n−1)-th partial decoding step, the decoding apparatus 900 may recalculate a probability of a candidate beam associated with an increased amount of the sound source using the probability recalculation module 960. Since tokens of the candidate beam are known already, the probability recalculation module 960 may obtain probabilities all at once by calculating probabilities for each of the tokens in parallel and summing the probabilities, instead of needing to perform auto-regressive decoding that sequentially repeats decoding steps. Thus, a time used to repeat auto-regressive decoding up to a corresponding step may be reduced despite the same number of operations.

The decoding apparatus 900 may prepare a candidate beam to be input to the decoder module 923-3 and an initial probability value to be input to a beam search module 926-3, for the n-th partial decoding step, so that a decoding module 920-3 may perform auto-regressive decoding a limited number of times.

The decoder module 923-3 may decode the encoded vector sequence generated by encoding the input sequence 955, and the candidate beam corresponding to the stable decoding step, or the beam state corresponding to results obtained by performing the beam search algorithm in the two immediately preceding steps. The candidate beam and the beam state may be received from the stabilized beam decision module 950. An output result of the decoder module 923-3 may correspond to, for example, "4×1088" candidate beams.

The beam search module 926-3 may output a candidate beam having a highest probability among the "4×1088" candidate beams as a decoding result 970 of the n-th partial decoding step.

In an example, by forcing only a beginning portion having a high possibility of being stabilized to be decoded, a probability of an unstable sound source may decrease, and thus the decoding apparatus 900 of one or more embodiments may prevent a decoding step from being frequently repeated. Also, by performing auto-regressive decoding a set number of times, the decoding apparatus 900 of one or more embodiments may maintain a constant amount of time used for each partial decoding step even though a length of a sound source increases and the sound source is delayed.

In an example, when a high probability is maintained because a speech input has a clear pronunciation, the stabilized beam decision module 950 may determine that most of additional decoding results continue to be stable in each partial decoding step, and a number of stable (sound source) regions may quickly increase for each partial decoding step. In another example, when a decoding result is frequently changed, the stabilized beam decision module 950 may discard an added result in each partial decoding step and may repeatedly perform decoding until waves are sufficiently accumulated so that the decoding result is stabilized.

In a last partial decoding step in which no sound source is received, the decoding apparatus 900 may perform decoding until the beam search module 926 satisfies an end condition, without a limitation on a number of times for decoding, and may output a result.

Figure 10:
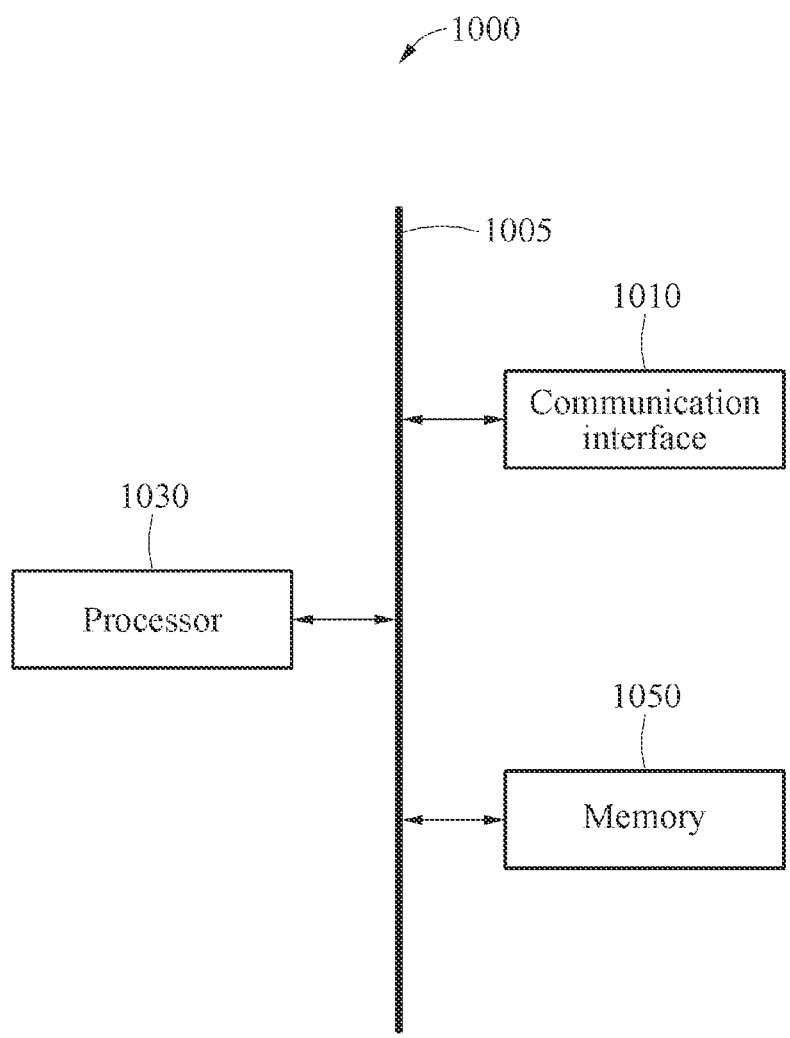
FIG. 10 illustrates an example of a decoding apparatus.

FIG. 10 illustrates an example of a decoding apparatus. Referring to FIG. 10, a decoding apparatus 1000 may include a communication interface 1010, a processor 1030 (e.g., one or more processors), and a memory 1050 (e.g., one or more memories). The communication interface 1010, the processor 1030, and the memory 1050 may communicate with each other via a communication bus 1005.

The communication interface 1010 may receive an input sequence corresponding to an input speech at a current time.

The processor 1030 may generate an encoded vector sequence by encoding the input sequence. The processor 1030 may determine reuse tokens from candidate beams of at least two previous times by comparing the candidate beams of the previous times. The processor 1030 may decode at least one token subsequent to the reuse tokens based on the reuse tokens and the encoded vector sequence. The processor 1030 may generate a speech recognition result of the input speech based on the decoded at least one token subsequent to the reuse tokens. The communication interface 1010 may output the speech recognition result (e.g., through a display and/or speaker of the communication interface 1010).

Also, the processor 1030 may perform any or all of the methods described with reference to FIGS. 1 through 9, and/or one or more algorithms corresponding to any or all of the methods. The processor 1030 may be a hardware-implemented data processing apparatus having a circuit that is physically structured to execute desired operations. For example, the desired operations may include code or instructions included in a program. The hardware-implemented data processing apparatus may include, for example, a microprocessor, a central processing unit (CPU), a processor core, a multi-core processor, a multiprocessor, an application-specific integrated circuit (ASIC), or a field-programmable gate array (FPGA).

The processor 1030 may execute a program and may control the decoding apparatus 1000. Code of the program executed by the processor 1030 may be stored in the memory 1050.

The memory 1050 may store candidate beams that are to be used for decoding of a next time for each of previous times of decoding. The memory 1050 may store a variety of information generated in a processing process of the above-described processor 1030. Also, the memory 1050 may store a variety of data and programs. The memory 1050 may include, for example, a volatile memory or a non-volatile memory. The memory 1050 may include a high-capacity storage medium such as a hard disk to store a variety of data.

The decoding apparatuses, encoder modules, decoding modules, decoder modules, beam search modules, stabilized beam decision modules, probability recalculation modules, communication interfaces, processors, memories, communication buses, decoding apparatus 900, encoder module 910, encoder module 910-1, encoder module 910-2, encoder module 910-3, decoding module 920, decoding module 920-1, decoding module 920-2, decoding module 920-3, decoder module 923, decoder module 923-1, decoder module 923-2, decoder module 923-3, beam search module 926, beam search module 926-1, beam search module 926-2, beam search module 926-3, stabilized beam decision module 950, probability recalculation module 960, decoding apparatus 1000, communication interface 1010, processor 1030, memory 1050, communication bus 1005, and other apparatuses, units, modules, devices, and components described herein with respect to FIGS. 1-10 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A decoding method, the method comprising:
   receiving an input sequence corresponding to an input speech at a current time; and in a neural network (NN) for speech recognition,
generating an encoded vector sequence by encoding the input sequence,
determining reuse tokens by determining whether substrings included in candidate beams of two or more previous times match, wherein the candidate beams of two or more previous times comprise different numbers of tokens, and
decoding one or more tokens subsequent to the reuse tokens based on the reuse tokens and the encoded vector sequence,
wherein the determining of the reuse tokens comprises:
determining a reuse time of tokens at a current time n, being the current time, subsequent to a previous time n−1 subsequent to a previous time n−2 based on a comparison result between a candidate beam of the previous time n−2 and a candidate beam of the previous time n−1, wherein n is a natural number greater than or equal to "3"; and
determining candidate beams accumulated up to the reuse time to be the reuse tokens.

2. The method of claim 1, wherein the determining of the reuse time comprises determining a time in which a largest number of substrings match in the candidate beam of the previous time n−2 and the candidate beam of the previous time n−1, as the reuse time of the tokens at the current time n.

3. The method of claim 1, further comprising storing either one or both of:
a candidate beam having a highest probability among probabilities of candidate beams up to the reuse time; and
a beam state corresponding to the candidate beam having the highest probability.

4. The method of claim 1, wherein the decoding of the one or more tokens comprises, in response to the input speech not being ended, decoding the one or more tokens a preset number of times.

5. The method of claim 1, wherein the decoding of the one or more tokens comprises:
predicting probabilities of token candidates subsequent to the reuse tokens based on the reuse tokens and the encoded vector sequence; and
determining the one or more tokens based on the probabilities of the token candidates.

6. The method of claim 1, wherein the generating of the encoded vector sequence comprises generating the encoded vector sequence by encoding the input sequence using an encoder layer included in the NN.

7. The method of claim 1, further comprising:
in the NN, generating a cumulative sequence by accumulating the input sequence corresponding to the input speech at the current time to input sequences of the previous times,
wherein the generating of the encoded vector sequence comprises generating the encoded vector sequence by encoding the cumulative sequence.

8. The method of claim 1, wherein the NN comprises an attention-based encoder-decoder model including an encoder layer and an auto-regressive decoder layer.

9. The method of claim 1, further comprising generating a speech recognition result of the input speech based on the decoded one or more tokens subsequent to the reuse tokens.

10. The method of claim 1, wherein the decoding of the one or more tokens comprises:
determining candidate beams that are to be used for decoding of a next time, based on a probability of a combination of tokens at previous times of the decoding among the two or more previous times; and
decoding the one or more tokens using one or more candidate beams corresponding to the reuse time of tokens among the candidate beams.

11. The method of claim 10, wherein the decoding of the one or more tokens comprises:
inputting the one or more candidate beams corresponding to the reuse time of the tokens among the candidate beams to an auto-regressive decoder layer included in the NN; and
decoding the one or more tokens.

12. A non-transitory computer-readable storage medium storing instructions that, when executed by a processor, configure the processor to execute a decoding method, the decoding method comprising:
receiving an input sequence corresponding to an input speech at a current time; and
in a neural network (NN) for speech recognition,
generating an encoded vector sequence by encoding the input sequence,
determining reuse tokens by determining whether substrings included in candidate beams of two or more previous times match, wherein the candidate beams of two or more previous times comprise different numbers of tokens, and
decoding one or more tokens subsequent to the reuse tokens based on the reuse tokens and the encoded vector sequence,
wherein the determining of the reuse tokens comprises:
determining a reuse time of tokens at a current time n, being the current time, subsequent to a previous time n−1 subsequent to a previous time n−2 based on a comparison result between a candidate beam of the previous time n−2 and a candidate beam of the previous time n−1, wherein n is a natural number greater than or equal to "3"; and
determining candidate beams accumulated up to the reuse time to be the reuse tokens.

13. A decoding apparatus with a neural network (NN) for speech recognition, the decoding apparatus comprising:
a communication interface configured to receive an input sequence corresponding to an input speech at a current time; and
a processor configured to use the NN to:
generate an encoded vector sequence by encoding the input sequence;
determine reuse tokens by determining whether substrings included in candidate beams of two or more previous times match, wherein the candidate beams of two or more previous times comprise different numbers of tokens; and
decode one or more tokens subsequent to the reuse tokens based on the reuse tokens and the encoded vector sequence,
wherein, for the determining of the reuse tokens, the processor is configured to
determine a reuse time of tokens at a current time n, being the current time, subsequent to a previous time n−1 subsequent to a previous time n−2 based on a comparison result between a candidate beam of the previous time n−2 and a candidate beam of the previous time n−1, wherein n is a natural number greater than or equal to "3", and
determine candidate beams accumulated up to the reuse time to be the reuse tokens.

14. The decoding apparatus of claim 13, wherein, for the determining of the reuse tokens, the processor is configured to determine a time in which a largest number of substrings match in the candidate beam of the previous time n−2 and the candidate beam of the previous time n−1, as the reuse time of the tokens at the current time n.

15. The decoding apparatus of claim 13, wherein, for the decoding of the one or more tokens, the processor is configured to
predict probabilities of token candidates subsequent to the reuse tokens based on the reuse tokens and the encoded vector sequence, and
determine the one or more tokens based on the probabilities of the token candidates.

16. The decoding apparatus of claim 13, wherein, for the generating of the encoded vector sequence, the processor is configured to generate the encoded vector sequence by encoding the input sequence using an encoder layer included in the NN.

17. The decoding apparatus of claim 13, wherein the processor is configured to use the NN to
generate a cumulative sequence by accumulating the input sequence corresponding to the input speech at the current time to input sequences of the previous times, and
for the generating of the encoded vector sequence, generate the encoded vector sequence by encoding the cumulative sequence.

18. The decoding apparatus of claim 13, further comprising:
a memory configured to store candidate beams that are to be used for decoding of a next time,
wherein, for the decoding of the one or more tokens, the processor is configured to
determine the candidate beams that are to be used for decoding of the next time, based on a probability of a combination of tokens at previous times of the decoding among the two or more previous times, and
decode the one or more tokens using one or more candidate beams corresponding to the reuse time of tokens among the candidate beams.

19. The decoding apparatus of claim 18, wherein, for the decoding of the one or more tokens, the processor is configured to
input the one or more candidate beams corresponding to the reuse time of the tokens among the candidate beams to an auto-regressive decoder layer included in the NN, and
decode the one or more tokens.

20. A decoding method, the method comprising:
in a neural network (NN) for speech recognition,
generating an encoded vector sequence by encoding an input sequence corresponding to an input speech at a current decoding time step,
determining reuse tokens by determining a largest sequence of tokens matching between candidate beams of previous time steps and based on candidate beams having highest probabilities among the candidate beams, wherein the candidate beams of two or more previous times comprise different numbers of tokens, and
decoding one or more tokens subsequent to the reuse tokens based on the reuse tokens and the encoded vector sequence,
wherein the determining of the reuse tokens comprises:
determining a reuse time of tokens at a current time n, being the current decoding time step, subsequent to a previous time n−1 subsequent to a previous time n−2 based on a comparison result between a candidate beam of the previous time n−2 and a candidate beam of the previous time n−1, wherein n is a natural number greater than or equal to "3"; and
determining candidate beams accumulated up to the reuse time to be the reuse tokens.

21. The method of claim 20, wherein the determining of the reuse tokens comprises determining, as the reuse tokens, portions of candidate beams of one of the previous time steps preceding the current time step up to a time corresponding to the largest sequence of tokens matching between the candidate beams of the previous time steps.

22. The method of claim 20, wherein the largest sequence of tokens matching between candidate beams of previous decoding time steps is from an initial time step up to a time step previous to the current time step.

* * * * *